United States Patent [19]

White et al.

[11] Patent Number: 5,438,114

[45] Date of Patent: Aug. 1, 1995

[54] METHOD FOR CONVERTING MACROCYCLIC POLYIMIDE OLIGOMERS TO LINEAR POLYIMIDES

[75] Inventors: Dwain M. White; Jane M. Terry, both of Schenectady, N.Y.

[73] Assignee: General Electric Company, Schenectady, N.Y.

[21] Appl. No.: 262,101

[22] Filed: Jun. 17, 1994

[51] Int. Cl.⁶ ............................................. C08G 73/10
[52] U.S. Cl. ...................... 528/322; 528/19; 528/21; 528/33; 528/37; 528/173; 528/207; 528/315; 528/319; 528/363
[58] Field of Search ................ 528/322, 19, 315, 363, 528/21, 319, 33, 37, 173, 207

[56] References Cited

U.S. PATENT DOCUMENTS

| 4,324,885 | 4/1982 | White et al. | 528/207 |
| 4,330,666 | 5/1982 | White et al. | 528/207 |
| 5,357,029 | 10/1994 | Takekoshi et al. | 528/322 |
| 5,362,845 | 11/1994 | Takekoshi et al. | 528/322 |

*Primary Examiner*—Paul R. Michl
*Assistant Examiner*—P. Hampton-Hightower
*Attorney, Agent, or Firm*—William H. Pittman

[57] ABSTRACT

Macrocyclic polyimide oligomers are converted to linear polyimides by heating with a primary amine in the presence of a tertiary amine, tertiary phosphine, quaternary ammonium salt, quaternary phosphonium salt or hexaalkylguanidinium salt or heterocyclic analog thereof as a macrocyclic polyimide polymerization catalyst.

13 Claims, No Drawings

METHOD FOR CONVERTING MACROCYCLIC POLYIMIDE OLIGOMERS TO LINEAR POLYIMIDES

BACKGROUND OF THE INVENTION

This invention relates to a method for preparing linear polyimides from macrocyclic polyimide oligomers.

Linear polyimides and polyetherimides are well known commercially available polymers having advantageous properties including thermooxidative resistance, good mechanical strength, excellent electrical properties and good chemical resistance. They are normally prepared from at least one tetracarboxylic acid derivative, typically a dianhydride, and at least one diamine in a two-step method, the first step being reaction of the diamine with the tetracarboxylic acid or derivative thereof to form a polyamic acid and the second step being conversion of the polyamic acid to a polyimide with elimination of water.

Methods of this type are generally limited to the preparation of relatively thin polyimide films, since it is necessary to remove volatiles (e.g., water and the solvents employed) without causing formation of bubbles and voids. In addition, the polyimides are extremely difficult to process after formation because of their lack of solubility in common solvents, high glass transition temperatures and extremely high melt viscosities, typically in excess of one million poise at 300° C. Thus, operations such as injection molding cannot be performed.

Macrocyclic polyimide oligomers are a genus of polyimide intermediates with which such operations may be employed. The preparation of the oligomers is disclosed in three copending applications, Ser. No. 08/341,815; Ser. No. 08/096,393, now U.S. Pat. No. 5,362,837; and Ser. No. 08/164,087, now U.S. Pat. No. 5,357,029. Their conversion to linear polyimides is disclosed in copending application Ser. No. 08/080,864, now U.S. Pat. No. 5,362,845. All of said applications are commonly owned herewith.

Said application Ser. No. 08/080,864 describes a method of conversion which requires the use of a primary amine as an initiator and a macrocyclic polyimide oligomer polymerization catalyst. The latter may be an alkaline earth or transition metal, a salt thereof or an alkali metal hydroxide or salt. As a result, the linear polyimide contains metal residues derived from the catalyst. The presence of such residues may have a deleterious effect on the properties of the polyimide, especially when it is to be used as a dielectric material. It would be desirable, therefore, to prepare linear polyimides from macrocyclic polyimide oligomers by a method which employs non-metal-containing catalysts.

SUMMARY OF INVENTION

The present invention provides an alternative method for converting macrocyclic polyimide oligomers to linear polyimides. Said method employs non-metal-containing catalysts and initiators. The products are chemically essentially identical to those obtained with the use of metal catalysts, and in some cases are superior thereto since they may have lower proportions of intermediates of low solubility, which may be the result of crosslinking or a similar type of reaction.

Accordingly, the invention is a method for preparing a linear polyimide which comprises heating, at a temperature in the range of about 300°–350° C. with a primary amine in the presence of a tertiary amine, tertiary phosphine, quaternary ammonium salt, quaternary phosphonium salt or hexaalkylguanidinium salt or heterocyclic analog thereof as a macrocyclic polyimide polymerization catalyst, a composition comprising macrocyclic polyimide oligomers of the formula

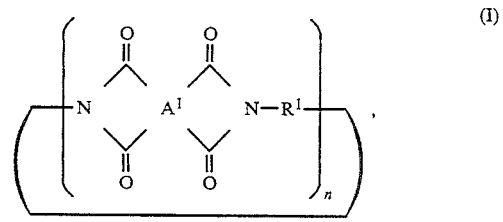

wherein each $A^1$ is independently a mono- or polycyclic aromatic radical, each $R^1$ is independently an organic or bis(alkylene)polydiorganosiloxane radical and n is at least 1.

DETAILED DESCRIPTION; PREFERRED EMBODIMENTS

The $A^1$ values in the compositions of formula I may be mono- or polycyclic aromatic radicals. An illustrative monocyclic radical is that derived from pyromellitic acid.

Most often, $A^1$ is a polycyclic radical and especially a radical of the formula

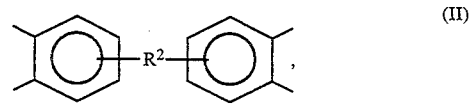

wherein $R^2$ is a single bond, a divalent aliphatic or alicyclic radical or halogenated derivative thereof containing about 1–12 carbon atoms, —O—, —CO—, —S—, —SO$_2$—, —O-Q-O—, —S-Q-S— or —SO$_2$-Q-SO$_2$— and Q is a divalent aliphatic or aromatic radical. Among the particularly preferred $A^1$ radicals are those having the formulas

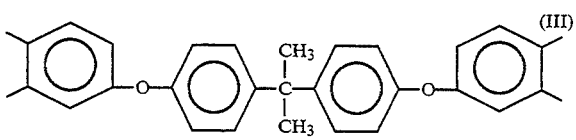

and

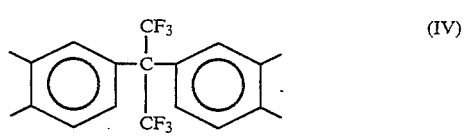

and

They may respectively be considered as being derived from 2,2-bis[4-(3,4-dicarboxyphenoxy)phenyl]propane and 2,2-bis(3,4-dicarboxyphenyl)-1,1,1,3,3,3-hexafluoropropane (hereinafter "BPATA" and "6FTA", respectively). Macrocyclic polyetherimides, as illustrated by compositions containing moieties of formula III, are also frequently preferred.

The $R^1$ value may be an organic radical or a bis(alkylene)polydiorganosiloxane, typically bis(alkylene)- polydimethylsiloxane, radical. Organic radicals are generally preferred. They include aromatic and especially $C_{6-20}$ aromatic radicals, as illustrated by m-phenylene, p-phenylene, bis(4-phenylene)methane and bis(4-phenylene) ether radicals, and aliphatic radicals, especially $C_{2-20}$ aliphatic radicals such as ethylene, trimethylene, hexamethylene and neopentylene. The aromatic radicals are generally preferred, and especially the m-phenylene and 1,3-bis(4-phenyleneoxy)benzene radicals; i.e., those present in m-phenylenediamine and 1,3-bis(4-aminophenoxy)benzene.

The polymerization of macrocyclic copolyimides is within the scope of the invention. These are compositions containing structural units with $A^1$ and/or $R^1$ groups having more than one molecular structure.

The preferred macrocyclic polyimides for use in the present invention are those in which neither $A^1$ or $R^1$ contains a spiro(bis)indane moiety. U.S. Pat. No. 4,980,453 discloses compounds containing such moieties; said compounds have a unique capability of forming macrocyclic oligomers, and the methods for polymerizing such oligomers are not generically applicable to the preparation of macrocyclic polyimides.

The value of n is at least 1; i.e., the compositions of the invention include macrocyclic "monomers" as well as oligomers having degrees of polymerization of at least 2 and especially up to about 12. For the most part, said compositions are mixtures of oligomers having the same structural units but differing degrees of polymerization.

The macrocyclic polyimide oligomers employed in the present invention may be prepared by contacting, under reaction-promoting conditions, (A) at least one diamine of the formula

$$H_2N-R^1-NH_2$$

with (B) at least one aromatic tetracarboxylic acid of the formula

$$A^1(COOH)_4$$

or dianhydride thereof, wherein $A^1$ and $R^1$ are as previously defined, at least one phenolic compound also being present if reagent B is a tetracarboxylic acid; said diamine and tetracarboxylic acid being maintained in high dilution in a substantially non-polar organic liquid and in equimolar proportions throughout the contacting procedure. Said macrocyclic oligomers and the aforementioned method are disclosed and claimed in the aforementioned application Ser. No. 08/164,087.

The substantially non-polar organic liquids employed in such preparation are preferably liquids which form azeotropic mixtures with water. Aromatic hydrocarbons such as toluene and xylene are often especially preferred.

It is essential that reagents A and B be maintained in equimolar proportions throughout the procedure. For this purpose, it has been found particularly advantageous to employ a tetracarboxylic acid as reagent B and to feed a mixture of equimolar proportions of reagents A and B, dissolved in a common solvent, to a reaction vessel containing the organic liquid and phenolic compound. The solvent is generally a polar organic liquid, especially an ether such as tetrahydrofuran or diethylene glycol dimethyl ether, ethers being excellent solvents for the tetracarboxylic acid and diamine.

It is also contemplated to include in the tetracarboxylic acid-diamine solution a small proportion of water, typically up to about 5% by weight based on combined reagents A and B and solvent. The presence of water frequently assists in maintaining said reagents in solution by suppressing salt crystallization.

It is further contemplated to employ a dianhydride as reagent B. However, this is often not as convenient as the employment of a tetracarboxylic acid since dianhydrides tend to react with diamines immediately upon blending, forming linear polyamic acids. It is thus necessary in this case to charge reagents A and B separately into the reaction vessel, and such introduction in precisely equimolar proportions is difficult.

Also present in the reaction mixture is at least one phenolic compound such as phenol, o-cresol, m-cresol, p-cresol or a chlorophenol. It is believed that the function of the phenolic compound is to interact as an acid with free amine groups present in the reaction mixture, suppressing attack by such groups on the macrocyclic oligomers formed but permitting reaction with more acidic carboxylic acid groups to form said oligomers. The phenolic compound is usually present in substantial excess, typically in a molar ratio to reagent A of at least about 20:1 and preferably at least about 40:1.

It is also frequently preferred to incorporate in the reaction mixture at least one conventional polyimide formation catalyst, typically a phosphinic acid salt such as sodium phenylphosphinate or a heterocyclic amine such as 4-dimethylaminopyridine. It is employed in catalytic proportions, generally about 1-5 mole percent based on reagent B, and is generally present in admixture with the organic liquid and phenolic compound.

For the preparation of macrocyclic polyimide oligomers, it is essential that reagents A and B be maintained in high dilution during the procedure. This is generally easy to achieve via "pseudo-high dilution" techniques, by adding said reagents gradually to the combination of organic liquid and phenolic compound whereupon rapid reaction takes place. Thus, product concentration increases but the concentration of reactants remains relatively low. Typically, the total volume of combined organic liquid and phenolic compound is at least 10 ml. per gram of reagents A and B combined.

It is frequently convenient to add the combination of reagent A, reagent B and solvent dropwise to a mixture of the organic liquid, phenolic compound and catalyst if employed, and to distill off volatiles including solvent, water of reaction and any water employed to maintain reagents A and B in solution. Typical reaction temperatures are in the range of about 120°-175° C. An inert atmosphere such as nitrogen is preferably employed. When separation of water appears to be complete, it may be advisable to employ efficient water removal means, such as by circulating the distillate through a bed of molecular sieves, to drive the reaction to completion. Following completion, the composition of the invention may be recovered by conventional means such as distillation, extraction and/or anti-solvent precipitation.

The preparation of macrocyclic polyimide oligomer compositions is illustrated by the following examples.

EXAMPLE 1

BPATA, 7.692 grams (13.82 mmol.), and m-phenylenediamine, 1.495 grams (13.82 mmol.), were dissolved in 20 ml. of tetrahydrofuran under nitrogen and the clear solution was charged to an addition funnel. A 500-ml. 3-necked flask equipped with a thermometer and distillation adapter was charged with 75 ml. of m-cresol, 25 ml. of toluene and 50 mg. of sodium phenylphosphinate and the addition funnel was fitted to the flask. The contents of the flask were heated to reflux under nitrogen and the solution in the funnel was added dropwise over 11 hours, with a mixture of water, tetrahydrofuran and toluene being removed by distillation. The toluene was replenished (total addition 35 ml.) during the reaction and the temperature in the flask was maintained at 145°–155° C.

After removal of water and tetrahydrofuran was complete, the refluxing toluene was recirculated through a bed of molecular sieves for ½ hour. The reaction mixture was then cooled and analyzed by high pressure liquid chromatography, which showed the presence of macrocyclic polyetherimide oligomers.

The mixture was poured into 400 ml. of acetonitrile in a blender and filtered. The filtrate was concentrated in vacuum, leaving a yellow solid which was washed with methanol and dried. Analysis by field desorption mass spectroscopy and high pressure liquid chromatography showed it to be the desired oligomer composition, comprising macrocyclic compounds wherein n is 1 or greater and principally the dimer, trimer, tetramer and pentamer.

The filtration residue was extracted with acetonitrile in a Soxhlet extractor, whereupon an additional 124 mg. of macrocyclic oligomers was isolated. A further 750 mg. was isolated by extraction with tetrahydrofuran. The total yield of material melting at 215°–260° C. was 1.38 grams, or 17% of theoretical. The purified material had melt viscosities at 330°, 300° and 280° C. of 10, 45 and 350 poise, respectively.

EXAMPLE 2

A 1-liter 3-necked flask equipped with a thermometer, distillation adapter and addition funnel was charged under nitrogen with 300 ml. of m-cresol, 50 ml. of toluene and 100 mg. of sodium phenylphosphinate. The addition funnel was charged under nitrogen with a solution of 24.01 grams (50 mmol.) of 6FTA and 5.407 grams (50 mmol.) of m-phenylenediamine. The flask was heated to reflux in an oil bath and the solution in the addition funnel was added over 8½ hours, with removal of water, tetrahydrofuran and a portion of the toluene by distillation. The reaction temperature was maintained at about 165° C. The toluene was replenished during the reaction to a total amount of 50 ml.

After the tetrahydrofuran solution had been added, the mixture was heated for an additional 1½ hours and analyzed by high pressure liquid chromatography, which showed the presence of macrocyclic polyimide oligomers comprising principally the dimer, trimer, tetramer and pentamer. The mixture was concentrated in vacuum and the residue was diluted with 100 ml. of methylene chloride, forming a solution which was poured into methanol in a blender. The light yellow precipitate which formed was collected by filtration and dried.

The tided material was extracted overnight with a 1:5 (by volume) mixture of methylcyclohexane and toluene in a Soxhlet extractor. The extracts were evaporated, washed with methanol and dried. The residue after extraction was further extracted with toluene and the extracts were evaporated to dryness. Upon combination of the residual materials, there was obtained 7.68 grams (30% of theoretical) of the desired macrocyclic polyimide oligomers (n=1 or greater), as confirmed by field desorption mass spectroscopy.

EXAMPLE 3

A 1-liter 3-necked flask equipped with an addition funnel and a 20-cm. distillation column packed with glass helices was charged under nitrogen with 150 ml. of m-cresol, 50 ml. of toluene and 100 mg. of sodium phenylphosphinate. A solution of 12.460 grams (25.94 mmol.) of 6FTA and 7.584 grams (25.94 mmol.) of 1,3-bis(4-aminophenoxy)benzene in 75 ml. of tetrahydrofuran was charged to the addition funnel. The flask was heated to reflux in an oil bath and the solution in the funnel was added dropwise over 7 hours, with distillation of water, tetrahydrofuran and toluene. The temperature in the flask was maintained at about 155° C. and the toluene was replenished to a total of 10 ml.

After addition of the tetrahydrofuran solution was complete, the mixture was heated under reflux for an additional 40 minutes, whereupon high pressure liquid chromatographic analysis showed the presence of macrocyclic polyimide oligomers comprising principally those having degrees of polymerization up to 9.

The mixture was concentrated in vacuum and added to 100 ml. of acetonitrile, whereupon a precipitate formed. It was isolated and dispersed in 250 ml. of fresh acetonitrile, stirred at 50° C. for 1 hour and filtered. The combined filtrates were evaporated and the residue was triturated with methanol, yielding 2.17 grams (12.1% of theoretical) of macrocyclic polyimide oligomers with a melting point of 250°–260° C. and a glass transition temperature of 221.8° C. The structure was confirmed by field desorption mass spectroscopy.

EXAMPLE 4

A 3-liter 3-necked flask equipped with a distillation column, thermometer and inlet for addition of reagents was charged with 1.15 liters of m-cresol and 300 ml. of toluene. The mixture was heated to reflux under nitrogen and a solution of 230.41 grams (412.2 mmol.) of BPATA, 44.57 grams (412.2 mmol.) of m-phenylenediamine and 55 ml. of water in 2700 ml. of tetrahydrofuran was continuously added at 1 ml. per minute by the use of a pump, with removal of water, tetrahydrofuran and some toluene by distillation. The reaction temperature was maintained at 180° C. Toluene was replenished to a total of 5 liters. Upon workup as in Example 1, the desired macrocyclic polyetherimide oligomers were obtained in a yield of 10% of theoretical.

According to the present invention, the macrocyclic polyimide oligomer compositions are converted to linear polyimides by heating with a primary amine as initiator in the presence of a macrocyclic polyimide polymerization catalyst. Apparently, the primary amine attacks one of the polyimide carbonyl groups, opening the corresponding imide ring and forming a macrocyclic diamide which undergoes a macrocyclic ring-opening reaction to produce an amine-terminated linear polyimide oligomer. The latter is capable of further undergoing reaction with additional macrocyclic polyimide molecules to produce a high molecular weight linear polyimide.

Preparation of linear polyimides from macrocyclic oligomers according to the present invention has the advantage that said polyimides can conveniently be prepared in bulk rather than merely in the form of thin films, since no removal of solvent or water is necessary. Moreover, the macrocyclic oligomers have melt viscosities several orders of magnitude lower than that of a corresponding linear polyimide, whereby they are adapted to molding and extrusion. Thus, linear polyimides may be prepared in situ during such operations, in similar fashion to the preparation of linear polycarbonates and polyesters from macrocyclic oligomers as known in the art.

Any primary amine may be employed as an initiator in the method of the invention. Illustrative amines are stearylamine and 2,2-bis[4-(4-aminophenoxy)phenyl]-propane, hereinafter "BAPP".

The macrocyclic polyimide oligomer polymerization catalysts employed according to the present invention include tertiary amines, tertiary phosphines, quaternary ammonium salts, quaternary phosphonium salts, hexaalkylguanidinium salts and heterocyclic analogs thereof. By "heterocyclic analog" is meant a compound in one of the aformentioned classes in which two alkyl groups are replaced by an alkylene chain in such a way as to form a heterocyclic ring with a nitrogen or phosphorus atom. The strongly preferred amines, phosphines and salts are those having exclusively alkyl or alkylene groups bound to the catalytically active nitrogen or phosphorus atom, although aromatic heterocyclic groups may be present elsewhere in the molecule.

Illustrative catalysts include di-t-butylethylenediamine, tetraethylethylenediamine, N,N'-di-(n-butyl)-N,N'-dimethylethylenediamine, 4-dimethylaminopyridine, 4-N-pyrrolidinopyridine, 2-hydroxypyridine, diazabicyclooctane, tetraphenylphosphonium bromide and hexaethylguanidinium bromide.

It is frequently advantageous to combine the catalyst and amine with the macrocyclic oligomers in solution or dispersion in water and/or a suitable solvent, typically an alkanol such as methanol. Following combination and before polymerization, the solvent is removed by evaporation.

The proportion of primary amine employed for polymerization is at least about 1 and preferably about 1-10 mole percent. Typical catalyst proportions are about 0.5-1.0 mole percent. Both proportions are based on structural units in the macrocyclic oligomers. Polymerization is typically conducted in a sealed vessel.

The method of this invention is illustrated by the following examples.

EXAMPLES 5-14

Macrocyclic polyetherimide oligomers prepared substantially according to the method of Example 1 were combined with 4% by weight, based on said oligomers, of BAPP and various proportions of macrocyclic polyimide oligomer polymerization catalysts. The mixtures were dried in a nitrogen atmosphere and charged to a glass ampule which was stoppered and heated with an aluminum block at 330° C. for ½ hour. The ampules were then quenched in cold water and opened, and the contents were analyzed by high pressure liquid chromatography.

The results are given in the following table, in comparison with three controls: Control 1, in which no catalyst was present; Control 2, in which no initiator was present; and Control 3, in which the catalyst was zinc acetate. Also employed as a comparison as a blank was an identical, unreacted sample of macrocyclic oligomers.

| | Catalyst | | |
|---|---|---|---|
| Example | Identity | Weight percent | Linear polyetherimide, % |
| 5 | Dibutylethylenediamine | 1.0 | 67 |
| 6 | " | 0.2 | 86 |
| 7 | Tetraethylethylenediamine | 1.0 | 60 |
| 8 | N,N'-di-n-butyl-N,N'-dimethylethylenediamine | 1.0 | 55 |
| 9 | 4-Dimethylaminopyridine | 1.0 | 58 |
| 10 | 4-N-Pyrrolidinopyridine | 1.0 | 51 |
| 11 | 2-Hydroxypyridine | 1.0 | 49 |
| 12 | Diazabicyclooctane | 1.0 | 50 |
| 13 | Tetraphenylphosphonium bromide | 1.0 | 59 |
| 14 | Hexaethylguanidinium bromide | 1.0 | 47 |
| Control 1 | — | — | 35 |
| Control 2* | Dibutylethylenediamine | 1.0 | 12 |
| Control 3 | Zinc acetate | 0.2 | 90 |

*No BAPP.

It can be seen that the catalysts employed in Examples 5-14 each afforded substantial proportions of linear polyetherimide. Control 1, in which no catalyst was employed, demonstrates that a certain amount of conversion to linear polyetherimide occurs even in the absence of the catalyst. The same is not true of the absence of initiator, since the product of Control 2 contained only 12% linears, which is the same amount present in a blank consisting of macrocyclic polyetherimide oligomers as prepared.

The product of Control 3 contained a substantial proportion of polymer insoluble in tetrahydrofuran. It is postulated that said insoluble polymer may be lightly crosslinked polyetherimide. By contrast, no insoluble fraction was observed in the products of Examples 5 and 7-14.

What is claimed is:

1. A method for preparing a linear polyimide which comprises heating, at a temperature in the range of about 300°-350° C. with a primary amine in the presence of a tertiary amine, tertiary phosphine, quaternary ammonium salt, quaternary phosphonium salt or hexaalkylguanidinium salt or heterocyclic analog thereof as a macrocyclic polyimide polymerization catalyst, a composition comprising macrocyclic polyimide oligomers of the formula

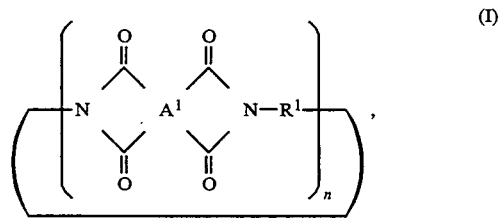

wherein each $A^1$ is independently a mono- or polycyclic aromatic radical, each $R^1$ is independently an organic or bis(alkylene)polydiorganosiloxane radical and n is at least 1.

2. A method according to claim 1 wherein $A^1$ has the formula

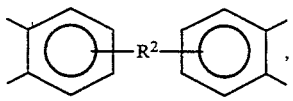

wherein $R^2$ is a single bond, a divalent aliphatic or alicyclic radical or halogenated derivative thereof containing about 1–12 carbon atoms, —O—, —CO—, —S—, —SO$_2$—, —O-Q-O—, —S-Q-S— or —SO$_2$-Q-SO$_2$— and Q is a divalent aliphatic or aromatic radical.

3. A method according to claim 1 wherein $A^1$ has at least one of the formulas

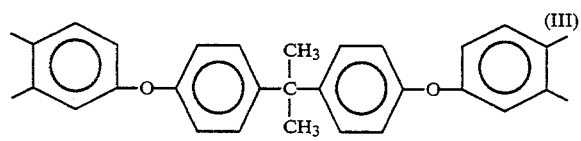

and

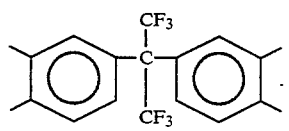

4. A method according to claim 1 wherein $R^1$ is an organic radical.

5. A method according to claim 4 wherein $R^1$ is a $C_{6-20}$ aromatic or $C_{2-20}$ aliphatic radical.

6. A method according to claim 5 wherein $R^1$ is m-phenylene or 1,3-bis(4-phenyleneoxy)benzene.

7. A method according to claim 1 wherein said composition comprises a mixture of oligomers of differing degrees of polymerization.

8. A method according to claim 7 wherein the amine, phosphine or salt has exclusively alkyl or alkylene groups bound to the catalytically active nitrogen or phosphorus atom.

9. A method according to claim 7 wherein the catalyst is di-t-butylethylenediamine, tetraethylethylenediamine, N,N'-di-(n-butyl)-N,N'-dimethylethylenediamine, 4-dimethylaminopyridine, 4-N-pyrrolidinopyridine, 2-hydroxypyridine, diazabicyclooctane, tetraphenylphosphonium bromide or hexaethylguanidinium bromide.

10. A method according to claim 1 wherein the amine is stearylamine or 2,2-bis[4-(4-aminophenoxy)phenyl]propane.

11. A method according to claim 1 wherein the proportion of amine is about 1–10 mole percent based on structural units in the macrocyclic oligomers.

12. A method according to claim 1 wherein the proportion of catalyst is about 0.5–1.0 mole percent based on structural units in the macrocyclic oligomers.

13. A method according to claim 1 wherein the reaction is conducted under pressure.

* * * * *